United States Patent Office.

JOHN S. WILLIAMS, OF WARSAW, OHIO.

Letters Patent No. 62,717, dated March 5, 1867.

---

IMPROVED OINTMENT FOR TREATING DISEASES IN HORSES AND OTHER ANIMALS.

---

*The Schedule referred to in these Letters Patent and making part of the same.*

---

TO ALL WHOM IT MAY CONCERN:

Be it known that I, JOHN S. WILLIAMS, of the town of Warsaw, in the county of Coshocton, and State of Ohio, have invented a new medicine called Spanish Ointment for Horses, for the cure of the following complaints in horses; and I do hereby declare that the following is a full and exact description thereof, reference being had to the accompanying list:

To three ounces cantharides, pulverized, two ounces oil spike, three ounces tincture iodine, one ounce gum camphor, five drams corosive sublimate, three ounces spirits turpentine, two ounces gum euphorbium, one quart fish or lard oil.

When well mixed, and all the ingredients are dissolved, it is fit for use.

To enable others to use my invention, I will describe its uses, to wit:

It is an infallible remedy for blood or bog spavin, sweeney, puffs, callous lumps, curb, fistula, poll-evil, &c. It will kill all cases of ringbone, and in many cases of short standing it will take it entirely away. This medicine creates a sore which will run the disease away without leaving a scar.

Having thus described my invention, what I claim, and desire to secure by Letters Patent of the United States, is—

The improved Spanish Ointment for treating the diseases of horses, prepared substantially as herein set forth and described.

JOHN S. WILLIAMS.

Witnesses:
 H. BLACKMAN,
 WM. BAAD.